(12) United States Patent
Durant

(10) Patent No.: US 8,410,232 B2
(45) Date of Patent: Apr. 2, 2013

(54) EMULSION POLYMERIZATION OF ESTERS OF ITACONIC ACID

(75) Inventor: Yvon Durant, Lee, NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 12/970,137

(22) Filed: Dec. 16, 2010

(65) Prior Publication Data

US 2011/0144265 A1    Jun. 16, 2011

Related U.S. Application Data

(60) Provisional application No. 61/287,162, filed on Dec. 16, 2009.

(51) Int. Cl.
  *C08F 2/24* (2006.01)
(52) U.S. Cl. .......... 526/203; 524/533; 524/832
(58) Field of Classification Search .......... 524/533, 524/832; 526/203
  See application file for complete search history.

(56) References Cited

U.S. PATENT DOCUMENTS

| | | | |
|---|---|---|---|
| 5,223,592 | A | 6/1993 | Hughes et al. |
| 5,336,744 | A | 8/1994 | Swift et al. |
| 6,197,907 | B1 | 3/2001 | Yoshida et al. |
| 6,646,086 | B2 | 11/2003 | Slone |
| 6,696,518 | B1 | 2/2004 | Dersch et al. |
| 7,040,747 | B2 | 5/2006 | Kubota et al. |
| 2008/0009563 | A1 | 1/2008 | Leyrer et al. |
| 2009/0286847 | A1 | 11/2009 | Fang et al. |
| 2011/0037013 | A1 | 2/2011 | Ragunathan et al. |

OTHER PUBLICATIONS

Hua et al. Journal of Chemical Engineering of Chinese Universities, vol. 22, No. 5, Oct. 2008, pp. 816-821.*
STN structure search results (May 15, 2012).*
International Search Report and Written Opinion dated Feb. 23, 2010 issued in related International Patent Application No. PCT/US10/60726.

* cited by examiner

*Primary Examiner* — Vu A Nguyen
(74) *Attorney, Agent, or Firm* — Grossman, Tucker, Perreault & Pfleger, PLLC

(57) ABSTRACT

Esters of itaconic acid are polymerized in aqueous medium in the presence of seed particles. The seed particles may absorb the monomer and provide for polymerization to a desired particle size. The polymers that are produced may be employed in adhesives, paints, and paper formulations.

20 Claims, No Drawings

EMULSION POLYMERIZATION OF ESTERS OF ITACONIC ACID

CROSS-REFERENCE TO RELATED APPLICATIONS

This application claims the benefit of U.S. Provisional Application No. 61/287,162 filed on Dec. 16, 2009, which is fully incorporated herein by reference.

FIELD OF THE INVENTION

The present invention relates to the polymerization of esters of itaconic acid, for example, the alkyl esters of itaconic acid known as alkylitaconate. The polymerization may proceed via emulsion techniques (i.e. polymerization in an aqueous medium in the presence of emulsifying agents and water soluble initiators) that is preferably below the critical micelle concentration (i.e. not in the presence of micelles) in the presence of seed particles. In addition, one may now control conditions to promote sustained rates of polymerization and develop relatively high solid contents.

BACKGROUND

The polymerization of vinyl type monomers that contain pendant carboxylic acid functionality has always presented some unique challenges. For example, U.S. Pat. No. 5,223,592 reports that the critical aspect is to provide complete neutralization of an itaconic acid type monomer prior to conducting the polymerization reaction, where complete neutralization is identified as having two moles of base neutralizer for each mole of itaconic acid. U.S. Pat. No. 5,336,744 reports that polymers of itaconic acid are formed at high conversion by an aqueous polymerization process of partially neutralized monomer solution, water, polyvalent metal ion, and initiator.

Attention is also directed to U.S. Publication No. 2009/0286847 entitled "Polycarboxylic Acid Polymers" which relates to methods and polymer based upon vinyl type monomers that contain pendant carboxylic acid groups and ester group functionality.

SUMMARY

A method of polymerization comprising supplying a monomer having one or more of the following structures:

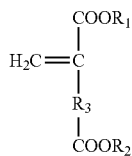

wherein $R_1$ and $R_2$ are selected from a alkyl group (e.g. $-(C_nH_{2n+1})$ where n has a value of 1-18, or an aromatic group, or a cyclic alkyl group or a hydrogen atom, and combinations thereof and wherein $R_3$ may be selected from an alkyl group, aromatic functionality, heteroaromatic functionality, cyclic alkyl group, heterocylic group, or combinations thereof;

supplying seed particles in an aqueous medium containing emulsifying agents and adding said monomer to said aqueous medium wherein said seed particles absorb said monomer and said seed particles are present at a concentration to allow for control of the particle size of said monomer to be polymerized; and polymerizing said monomer.

DETAILED DESCRIPTION

Throughout the description, like reference numerals and letters indicate corresponding structure throughout the several views. Also, any particular feature(s) of a particular exemplary embodiment may be equally applied to any other exemplary embodiment(s) of this specification as suitable. In other words, features between the various exemplary embodiments described herein are interchangeable as suitable, and not exclusive.

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting. The use of "including," "comprising," or "having" and variations thereof herein is meant to encompass the items listed thereafter and equivalents thereof as well as additional items.

The monomers that may be polymerized in the emulsion procedures of the present invention are as follows:

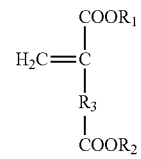

wherein $R_1$ and $R_2$ are selected from a alkyl group (e.g. $-(C_nH_{2n+1})$ where n has a value of 1-18), or an aromatic group, or a cyclic alkyl group, or a hydrogen atom and combinations thereof. In addition, $R_3$ may be selected from an alkyl group, aromatic functionality, heteroaromatic functionality, cyclic alkyl group, heterocylic group, or combinations thereof. The monomers may initially be polymerized in a first stage polymerization to provide what is described herein as seed particle. Such seed particles may then be exposed to additional amounts of the above noted monomers wherein the seed particles may then absorb such monomers and allow for ensuing polymerization.

Accordingly, the seed particles herein may be comprised of polymers having the following structure:

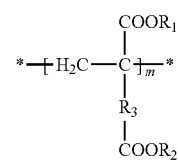

wherein $R_1$ and $R_2$ are again selected from a alkyl group (e.g. $-(C_nH_{2n+1})$ where n has a value of 1-18, or an aromatic group, or a cyclic alkyl group, and combinations thereof and wherein $R_3$ is selected from an alkyl group, aromatic functionality, heteroaromatic functionality, cyclic alkyl group, heterocylic group, or combinations thereof and wherein m has a value such that the seed particle has a number average molecular weight or Mn value of 4,000 to 500,000 g/mole and a weight average molecular weight or Mw value of 6,500 to 750,000 g/mole.

Preferably, the monomers provided herein are completely bio-based, which may be understood to mean that they are more recently derived from plant biomass and are not petroleum sourced. For example, one may isolate itaconic acid from the fermentation of glucose which may then be esterified with an alcohol, where the alcohol is also similarly derived from plant biomass, and not from petroleum sources. The monomers are also those which are effectively polymerized by free-radical initiators such as AIBN and/or 2,2'-Azobis[2-methyl-N-(2-hydroxyethyl)propionamide] and/or anionic type free-radical initiators such as sodium persulfate. The level of free-radical and/or anionic type initiator may preferably be such that the weight ratio of initiator to monomer is $10^{-4}$ to $3 \times 10^{-2}$. Accordingly, it may be appreciated that the polymerization here is one that may include free-radical type polymerization that is occurring at the same time as anionic type polymerization.

In addition, the monomer compositions herein may preferably include any mixtures of vinyl (unsaturated) monomers that also may be polymerized by free-radical initiators and/or anionic type free radical initiators, wherein at least 50.0% or more by weight of the monomers are selected from the diester type monomers noted above (e.g. a dialkyl itaconate and/or a diaromatic itaconate). Accordingly, the present invention applies to copolymers of the diester type monomers noted above with different vinyl type monomers, which different vinyl type monomers herein may be understood as monomers that are not in the general category of a diester such as the dialkyl itaconate and/or diaromatic itaconate noted above.

For example, such monomers that are not of the diester type herein may include ethylene, vinyl acetate, butadiene, alkyl acrylates, styrene, etc.). For example, 50.0% by weight or more of the monomers may be selected from the alkyl itaconates noted above (where wherein $R_1$ and $R_2$ are selected from an alkyl group) wherein 50.0% or less by weight of the monomers are selected from different vinyl type monomer structure (again, monomers that are not dialkyl itaconates and/or diaromatic itaconates). This, in turn, provides a copolymer that includes, as a repeating unit present at a concentration of 50.0 weight percent or higher, an ester of itaconic acid. Preferably, the level of diester type monomer may be at a level of 90.0 weight percent or higher. The polymerization may also be preferably configured to include some relatively smaller amounts of acidic monomer (i.e. non-esterified monomers of the formulas noted above wherein at least one of $R_1$ and $R_2$ or both of $R_1$ and $R_2$ may be a hydrogen). For example, the polymerization of the dialkyl itaconates may proceed in the presence of 0.1 wt % to 5 wt % of itaconic acid or a mono alkyl itaconate type monomer.

The monomers noted above may therefore be polymerized in a seed particle latex, which is reference to the use of seed particles of a polymer, within a water medium, along with surfactant and/or emulsifying agent. The seed particles may therefore be those polymers which may then absorb the above indicated monomers, along with an increase in size (swelling) to about 5 times their original volume or in the range of 2 to 5 times their original volume. It may therefore be appreciated that in this manner, particle size may be controlled. The seed particles may also be preferably selected from those polymers that are also completely bio-based but do not exclude polymers from petroleum based sources such as polystyrene. The seed particles may preferably comprise, e.g., polydimethylitaconate, or polydiethylitaconate. The emulsion polymerization in the presence of seed particles may also be achieved either through a single stage or multistage fed emulsion type polymerization. For example, in a first stage the seed particles are prepared and in a second stage additional monomer is added to the aqueous phase containing the seed particles at a rate that allows for absorption of the additional monomer following by polymerization.

As alluded to above, the emulsion herein is one that includes a surfactant or emulsifying agent. The concentrations of surfactant and/or emulsifying agents are such that micelles are not formed as to allow the seed particles to ultimately control particle size. The surfactant or emulsifying agent may be either anionic or non-ionic or a combination of both and may be present at a preferred concentration such that the weight ratio of surfactant or emulsifying agent is in the range of $10^{-4}$ to $5 \times 10^{-2}$.

The polymerization equipment is preferably a closed reactor with mechanical stirring, temperature control, a reflux condenser, and atmospheric control to exclude oxygen. Parts of the materials are charged to the reactor initially, while other materials are added over a period of time, uniformly or not. A thermal initiator or initiator system is added in batch and/or over time to generate free radicals able to polymerize the subject monomer(s). Preferably a semi-continuous" addition of the monomers over a selected period of time is employed to introduce the monomers to the reactor.

The seed particles may preferably be at the 10 nm to 200 nm size range (largest linear dimension) and more preferably at the 30 nm to 150 nm range with a specific solids content of the seed particles in the range of 1.0 wt % to 40.0 wt %, preferably 5.0 wt % to 30.0 wt %. The seed particles may be made from petroleum based materials or, preferably, completely from bio-based materials.

Surfactant and other emulsifiers, are preferentially at a concentration to avoid micelle formation. Stated another way, the surfactant and emulsifier are present at a concentration to allow for the seed particles to control particle size of the polymerized ester based monomers noted herein as well as to limit re-nucleation and formation of a second crop of seed particles. Accordingly, the size of the preferred ester based polymers that are finally produced herein may preferably have a volume average particle size in the range of 20 nm to 500 nm and a number average particle size that is preferably in the range of 1 nm to 100 nm.

The solids content of the overall emulsions (after introduction of the ester based monomers noted herein to the seed particles in the aqueous media) may preferably be 20.0 wt % to 55.0 wt %, more preferably in the 35.0 wt % to 55.0 wt %. Reference to such solids content is reference to the percent of solids in the aqueous medium after evaporation of the aqueous phase which therefore includes the seed particles, surfactants and monomer. The emulsion may be configured to have a viscosity of less than or equal to 1000 cP.

The reaction temperature for polymerization in the presence of the seed particles may be in the range of 50° C. to 110° C., preferably 70° C. to 95° C. Monomer(s) addition time, as alluded to above, is now regulated, and controlled to allow polymerization to proceed more efficiently without the development of a significant amount of termination reactions which may then reduce molecular weight and may reduce reaction rates. Accordingly, the monomer addition to the seed particles in the aqueous medium may preferably take place over a period of about 0.25 to 24 hours, preferably 3 to 12 hours. Monomer addition rate was also controlled to be in the range of 5 to 25 wt %/hr per unit mass of total (final) polymer amount. Additionally, the weight ratio of monomer added to the seed particles is in the range 0.5 to 500, preferably 1.5 to 100. Post polymerization is allowed to proceed for a selected period of time, and may be for a period of about 1 hour past the end of monomer feed and up to 24 hours past the end of monomer feed.

Primary polymerization can be followed by an extended period of time ranging from 2 hrs to 500 hrs at temperatures between room temperature (25° C. to 70° C.) where polymerization is finished with a specific low-temperature redox free radical initiator system that allows one to achieve relatively high polymerization yields without explicit temperature control, for example in closed vessels called "blow-down reactors". The monomer conversion herein may reach the range of 75% to 99%, preferably in the range of 85% to 99%. The low-temperature redox free radical initiator system may include hydrogen peroxide/ascorbic acid or t-butyl peroxide/ascorbic acid.

The molecular weights obtained for the monomers polymerized herein indicate number average molecular weight values (Mn) in the range of 5000-100,000. In addition, the weight average molecular weight (Mw) values are in the range of 10,000-500,000. The molecular weight distributions (Mw/Mn) are observed to fall in the range of 1.5-5.0.

The glass transition temperatures (Tg) for the polymerized monomer within the seed particles are such that one may observe two or more glass transition temperatures when the seed particle polymer is different than the monomer that is absorbed and polymerized. That is, one may observe a first Tg between −40.0° C. to +20.0° C. (e.g. when one utilizes dibutyl itaconate) and a second Tg at a relatively higher range, from −35.0° C. to 110.0° C. (when one utilizes dimethyl itaconate). More preferably, the first Tg may be in the range of −35.0° C. to +5.0° C. and the second Tg may be in the range of +45.0° C. to 95° C. The Tg is the inflection point of the heat capacity versus temperature trace on a DSC analysis.

It should also be noted that another important characteristic of the polymerization procedure herein is that as can now be appreciated, in a first step, one may prepare the seed particle latex. This may then be followed by the second stage polymerization of the added monomer which is absorbed by the seed particles, which polymerization within the seed particles causes the seed particles to expand to the indicated sizes noted herein.

Accordingly, it may be appreciated that the present disclosure relates to the use of the indicated monomers, in an emulsion type polymerization, in the presence of relatively small sized seed particles, and the controlled rate of addition of monomer to provide sustained polymerization rates, reduced levels of termination reactions (e.g. reaction of the radical chain ends within individual particles), thereby providing particle size control of the ensuing polymers and overall improved stability to the emulsion polymerization system.

The above disclosed polymerization strategy utilizing emulsion procedures will have utility in markets that desire renewable/sustainable/biobased waterborne polymers, which may in turn serve as binder or adhesive type products. Markets may therefore include, but are not limited to, architectural coatings, graphic arts, waterborne adhesives, pressure sensitive adhesives and paper coatings.

EXAMPLES

In the examples provided below, it should be noted that solid contents were measured by mass loss using a moisture analyzer set to 160° C. At that temperature one may experimentally confirmed that both DBI and DMI completely evaporated over a few minutes.

Conversions were calculated by mass balance of the recipes, assuming that all volatile monomers and water are subjected to evaporation with the moisture analyzer.

Molecular weight where determined by Gel Permeation Chromatography, using tetrahydrofuran as the eluent and calibrated against polystyrene standards.

Particle size was measured by dynamic light scattering.

Glass transitions (Tg) were measured by differential scanning calorimetry (DSC) on the samples initially dried at 105° C. for at least 20 minutes and at a heating rate of 3° C./min using modulated heating with an amplitude of +/−2° C. with a period of 60 seconds.

Seed Particles

A seed polymer may be prepared by the following method: To a 1 L reactor, mechanically agitated at 300 rpm, was added 587.2 grams of dionized water, free of oxygen and carbon dioxide, 1.5 grams of sodium dodecyl sulfate, 150 grams of styrene. The reactor with the aqueous solution was purge with nitrogen and heated to 7° C. 1.22 grams of potassium persulfate was added to the reactor, and the heat and mechanical stifling was maintained for 5 hours. The resulting latex has a solid content of 20.6 wt %, and an average particle size diameter of 38 nm. This polystyrene seed had a molecular weight, weight average, of 498,000 g/mole.

Example I

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex seed polymer. The reactor and the aqueous solution were purged with nitrogen and heated to 80° C.

Using a perfusion syringe pump with linear addition, a solution of 20 ml of dimethyl itaconate was added over 6 hrs. Postpolymerization was carried out for an additional 12 hrs. The resulting latex was cooled down and analyzed.

The resulting polymer had a solid content of 19.64 wt %. Based on recipe mass balance, conversion was calculated to be 88%. Molecular weight number average was 20,662 g/mole and molecular weight average was 34,688 g/mole. Particle size was measured to be 303 nm volume average and 265 nm number average. Glass transition was 81.6° C.

Example II

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex seed polymer. The reactor and the aqueous solution were purged with nitrogen and heated to 80° C.

Using a perfusion syringe pump with linear addition, 20 ml of a solution of dimethyl itaconate and dibutyl itaconate in a wt % ratio of 60/40 (respectively) was added over 6 hrs. Post-polymerization was carried out for an additional 12 hrs. The resulting latex was cooled down and analyzed.

The resulting polymer had a solid content of 18.20 wt %. Based on recipe mass balance, conversion was calculated to be 84%. Molecular weight number average was 18,129 g/mole and molecular weight average was 34,982 g/mole. Particle size was measured to be 106 nm volume average and 45 nm number average. Glass transition was 51.9° C.

Example III

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex seed polymer. The reactor and the aqueous solution were purged with nitrogen and heated to 80° C.

Using a perfusion syringe pump with linear addition, 20 ml of dibutyl itaconate was added over 8 hrs. Post-polymerization was carried out for an additional 10 hrs. The resulting latex was cooled down and analyzed.

The resulting polymer had a solid content of 22.76 wt %. Based on recipe mass balance, conversion was calculated to be complete. Molecular weight number average was 10,216 g/mole and molecular weight average was 16,948 g/mole. Particle size was measured to be 39 nm volume average and 22 nm number average. Glass transition was −11.3° C.

Example IV

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex seed polymer. The reactor and the aqueous solution were purged with nitrogen and heated to 80° C.

Using a perfusion syringe pump with linear addition, 20 ml of dibutyl itaconate was added over 10 hrs. Post-polymerization was carried out for an additional 8 hrs. The resulting latex was cooled down and analyzed.

The resulting polymer had a solid content of 16.11 wt %. Based on recipe mass balance, conversion was calculated to be 78%. Molecular weight number average was 6,169 g/mole and molecular weight average was 11,237 g/mole. Particle size was measured to be 37 nm volume average and 22 nm number average. A large glass transition was recorded at −9.5° C. and a small glass transition was recorded at 108° C.

Example V

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex seed polymer. The reactor and the aqueous solution were purged with nitrogen and heated to 80° C.

Using a perfusion syringe pump with linear addition, 20 ml of a solution of dimethyl itaconate and dibutyl itaconate in a wt % ratio of 10/90 (respectively) was added over 10 hrs.

Post-polymerization was carried out for an additional 8 hrs. The resulting latex was cooled down and analyzed.

The resulting polymer had a solid content of 14.82 wt %. Based on recipe mass balance, conversion was calculated to be 71%. Molecular weight number average was 15,338 g/mole and molecular weight average was 26,059 g/mole. Particle size was measured to be 53 nm volume average and 31 nm number average. A relatively large glass transition was recorded at −5.8° C. and a relatively small glass transition was recorded at 109° C.

Example VI

To a 250 ml reactor, mechanically agitated at 200 rpm, was added 80 grams of dionized water, free of oxygen and carbon dioxide, 0.3 grams of sodium dodecyl sulfate, 0.2 grams of itaconic acid, 5 ml of latex obtained from example IV. The reactor and the aqueous solution were purged with nitrogen and heated to 80° C.

Using a perfusion syringe pump with linear addition, 20 ml of a solution of dimethyl itaconate (DMI) and dibutyl itaconate (DBI) in a wt % ratio of 10/90 (respectively) was added over 10 hrs. Post-polymerization was carried out for an additional 8 hrs. The resulting latex was cooled and analyzed.

The resulting polymer had a solid content of 17.77 wt %. Based on recipe mass balance, conversion was calculated to be 87%. Molecular weight number average was 13,991 g/mole and molecular weight average was 24,831 g/mole. Particle size was measured to be 51 nm volume average and 37 nm number average. Glass transition (Tg) was −8.2° C.

All of the resulting polymers formed in Examples I through VI were observed to have generally good colloidal stability and visually appeared to be free of noticeable coagulum as well as free of noticeable flocculation.

Example VII

To a 5 L reactor, mechanically agitated at 150 rpm, was added 2168 grams of dionized water, free of oxygen and carbon dioxide, 62 grams of sodium dodecyl sulfate, 83 grams of sodium hypophosphite, 521 grams of a polystyrene seed polymer (35 nm number average, 20% solid content). The reactor and the aqueous solution were purged with nitrogen and heated to 80° C.

Then, 31.3 grams of 33.3 wt. % sodium persulfate in water solution was added to the reactor. Using an dosing pump, 2150 grams of dimethyl itaconate was fed to the reactor over 18 hrs. Using a second dosing pump, 29.6 grams of 33.3 wt. % sodium persulfate in water solution was fed to the reactor over 18 hrs. Heating and stirring was maintained for an additional 2 hrs after the end of the feeds. Then the reaction temperature was decreased to 60° C. 5.3 grams of ascorbic acid was added to the reactor. 22.2 grams of 70 wt. % tert-butyl hydroperoxide in water solution was fed to the reactor over 7 hrs, using a perfusion syringe pump. Heating and stirring was maintained for an additional 5 hrs. The resulting latex was cooled down and analyzed.

The resulting polymer had a solids content of 47.0 wt. %. The conversion was calculated to be 94.1% via GPC. The number average molecular weight was 4,261 g/mole and the weight average molecular weight was 9,166 g/mole. Particle size was measured to be 210.4 nm volume average and 148.5 nm number average. The glass transition was recorded at −26.48° C.

Example VIII

To a 5 L reactor, mechanically agitated at 100 rpm, was added 634 grams of polydimethyl itaconate seed with 17.0 wt. % solid content, free of oxygen and carbon dioxide, 8 grams of sodium dodecyl benzene sulfonate, 11 grams of itaconic acid. The reactor and the aqueous solution were purged with nitrogen and heated to 80° C.

Then, 76 grams of dibutyl itaconate was added to the reactor, along with 1.4 grams of sodium persulfate. After one hour, 203 grams of dibutyl itaconate was fed to the reactor over 6 hrs, using a dosing pump. 4.2 grams of 33.3 wt. % sodium persulfate in water solution was added to the reactor over 6 hrs, using a second dosing pump. The resulting latex was cooled down and analyzed.

The resulting polymer had a solids content of 36.0 wt. %. The conversion was calculated to be 96% via GPC. The number average molecular weight was 17,700 g/mole and the weight average molecular weight was 276,120 g/mole. Particle size was measured to be 237.8 nm volume average and 108.7 nm number average. The glass transitions were recorded at −26.06° C., 17.9° C., and 50.94° C.

Example IX

To a 5 L reactor, mechanically agitated at 100 rpm, was added 2700 grams of water, free of oxygen and carbon dioxide, 1.4 grams of sodium dodecyl benzene sulfonate. The reactor and the aqueous solution were purged with nitrogen and heated to 75° C. 745 grams of diethyl itaconate was added to the reactor, along with 5.22 grams of sodium persulfate and 2.24 grams of 2,2-azobis(2-methyl-N-(2-hydroxyethyl)propionamide). The heat and mechanical stifling was maintained for 10 hours. The resulting latex had a solids content of 18.9 wt. %. The conversion was calculated to be 81% via GPC. The number average molecular weight was 12,578 g/mole and the weight average molecular weight was 66,783 g/mole. Particle size was measured to be 133.3 nm volume average and 96.8 nm number average. The glass transitions were recorded at 11.36° C. and 79.15° C.

Example X

To a 5 L reactor, mechanically agitated at 100 rpm, was added 1953 grams of polydiethyl itaconate seed particles with 18.9 wt. % solids content (Example IX), free of oxygen and carbon dioxide, 17 grams of sodium dodecyl benzene sulfonate, 17 grams of itaconic acid. The reactor and the aqueous solution were purged with nitrogen and heated to 80° C.

Then, 313 grams of a solution of dimethyl itaconate and dibutyl itaconate in a wt % ratio of 15/85 (respectively) was added to the reactor, along with 2.5 grams of sodium persulfate and 11.8 grams of 2,2-azobis(2-methyl-N-(2-hydroxyethyl)propionamide). After one hour, 527 grams of a solution of dimethyl itaconate and dibutyl itaconate in a wt % ratio of 15/85 (respectively) was fed to the reactor over 6 hrs, using a dosing pump. 7.6 grams of 33.3 wt. % sodium persulfate in water solution was added to the reactor over 6 hrs, using a second dosing pump. The resulting latex was cooled down and analyzed.

The resulting polymer had a solids content of 40.3 wt. %. The conversion was calculated to be 82.4% via GPC. The number average molecular weight was 10,405 g/mole and the weight average molecular weight was 33,887 g/mole. Particle size was measured to be 873 nm volume average and 163.1 nm number average. The glass transitions were recorded at −14.79° C. and 75.44° C.

Example XI

To a 5 L reactor, mechanically agitated at 100 rpm, was added 1240 grams of water, free of oxygen and carbon dioxide, 7 grams of sodium dodecyl benzene sulfonate. The reactor and the aqueous solution were purged with nitrogen and heated to 75° C. 350 grams of diethyl itaconate was added to the reactor, along with 2.45 grams of sodium persulfate and 1.05 grams of 2,2-azobis(2-methyl-N-(2-hydroxyethyl)propionamide). The heat and mechanical stifling was maintained for 6 hours. After 6 hours, the reaction temperature was increased to 80° C. 13.8 grams of sodium dodecyl benzene sulfonate and 13.8 grams of itaconic acid were added to the reactor. 257 grams of a solution of diethyl itaconate and dibutyl itaconate in a wt. % ratio of 25/75 (respectively) was added to the reactor, along with 6.9 grams of 2,2-azobis(2-methyl-N-(2-hydroxyethyl)propionamide). After one hour, 433 grams of a solution of diethyl itaconate and dibutyl itaconate in a wt % ratio of 25/75 (respectively) was fed to the reactor over 3 hrs, using a dosing pump. 6.9 grams of 2,2-azobis(2-methyl-N-(2-hydroxyethyl)propionamide) was dissolved in 50 grams of water and the solution was fed to the reactor over 6 hrs, using a second dosing pump. The resulting latex was cooled and analyzed. The resulting polymer had a solid content of 38.72 wt. %. The conversion was calculated to be 84.4% via GPC. The number average molecular weight was 10,645 g/mole and the weight average molecular weight was 26,487 g/mole. Particle size was measured to be 184.6 nm volume average and 144.1 nm number average. One of the glass transitions was recorded at 80.27° C.

It should also be appreciated that all of the various embodiments noted herein are interchangeable and features within any of the drawings may be used within each of the respective drawings, to optimize any and all of the disclosed characteristics of the polymerizations noted herein.

The foregoing description of several methods and embodiments has been presented for purposes of illustration. It is not intended to be exhaustive and obviously many modifications and variations are possible in light of the above teaching.

What is claimed is:

1. A method of polymerization comprising:
supplying a monomer having one or more of the following structures:

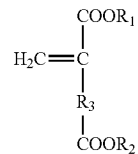

wherein $R_1$ and $R_2$ are selected from a hydrogen, a $C_{1-18}$ alkyl group, or an aromatic group, or a cyclic alkyl group, or combinations thereof and wherein $R_3$ is selected from an alkylene group, aromatic group, cyclic alkyl group, heterocyclic group, or combinations thereof;

supplying seed particles comprising polymer particles dispersed in an aqueous medium containing emulsifying agents and adding said monomer to said aqueous medium wherein said seed particles absorb said monomer; and polymerizing said monomer to a polymer having a particle size wherein said seed particles control said particle size of said polymerized monomer and wherein said polymer includes 50.0 weight percent or higher of an ester of itaconic acid.

2. The method of claim 1 wherein said monomer includes a mixture of monomers selected from 1) those wherein R1 and R2 are said alkyl group or aromatic group or cyclic alkyl group and is present at a level of 50.0% or more by weight of the monomers and 2) a vinyl monomer other than one wherein R1 and R2 are an alkyl group or aromatic group or cyclic alkyl group present at 50.0% by weight or less of the monomers.

3. The method of claim 1 wherein said seed particles have a size of 10 nm to 200 nm in largest linear dimension.

4. The method of claim 1 wherein said seed particles are present in said aqueous medium at a level of 1.0 weight percent to 40.0 weight percent.

5. The method of claim 1 wherein said monomer as polymerized has a volume average particle size of 20 nm to 500 nm.

6. The method of claim 1 wherein said monomer is added to said aqueous medium containing said seed particles over a period of 0.25 to 24.0 hours.

7. The method of claim 1 wherein the weight ratio of monomer to seed particle is in the range of 0.5 to 500.

8. The method of claim 1 wherein polymerization is carried out at temperatures of 50.0° C. to 110° C.

9. The method of claim 1 wherein said polymerization of said monomer having the indicated structures is initiated by an anionic and/or neutral type free-radical initiator.

10. The method of claim 9 wherein the weight ratio of said initiator to said monomer having the indicated structures is $10^{-4}$ to $3 \times 10^{-2}$.

11. The method of claim 1 wherein at least one of R1 or R2 is a hydrogen and is present in an amount of 0.1-5.0 weight percent.

12. The method of claim 1 wherein the monomers and seed particles are present at a solids content between 20.0 weight percent to 55.0 weight percent.

13. The method of claim 1 wherein the conversion of said monomer to polymer is at a level of 75% to 99%.

14. The method of claim 1 wherein said monomer is polymerized to a number average molecular weight (Mn) value of 5000 to 100,000.

15. The method of claim 1 wherein said monomer is polymerized to a weight average molecular weight (Mw) value of 10,000 to 500,000.

16. The method of claim 1 wherein said polymerized monomer exhibits a molecular weight distribution (Mw/Mn) in the range of 1.5 to 5.0.

17. The method of claim 1 wherein the resulting polymer indicates two glass transition temperatures comprising a first Tg from −40.0° C. to +20.0° C. and a second Tg in the range from −35.0° C. to 110.0° C.

18. The method of claim 1 wherein said seed particle is comprised of the following polymer structure:

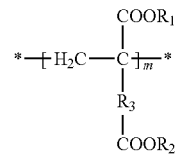

wherein $R_1$ and $R_2$ are selected from a hydrogen, a $C_{1-18}$ alkyl group, or an aromatic group, or a cyclic alkyl group, or combinations thereof and wherein $R_3$ is selected from an alkylene group, aromatic group, cyclic alkyl group, heterocylic group, or combinations thereof and wherein m has a value such that the seed particle has a Mn value of 4,000 to 500,000 g/mole.

19. The method of claim 1, wherein said seed particles comprise polydimethylitaconate.

20. The method of claim 1, wherein said seed particles comprise poly diethylitaconate.

* * * * *